United States Patent
Honma et al.

(10) Patent No.: US 9,410,707 B2
(45) Date of Patent: Aug. 9, 2016

(54) HEAT PUMP HOT-WATER SUPPLY SYSTEM

(75) Inventors: Masaya Honma, Osaka (JP); Susumu Kobayasi, Hyogo (JP)

(73) Assignee: PANASONIC INTELLECTUAL PROPERTY MANAGEMENT CO., LTD. (JP)

( * ) Notice: Subject to any disclaimer, the term of this patent is extended or adjusted under 35 U.S.C. 154(b) by 1047 days.

(21) Appl. No.: 13/498,735

(22) PCT Filed: Aug. 30, 2010

(86) PCT No.: PCT/IB2010/002116
§ 371 (c)(1),
(2), (4) Date: Apr. 26, 2012

(87) PCT Pub. No.: WO2011/036524
PCT Pub. Date: Mar. 31, 2011

(65) Prior Publication Data
US 2012/0205090 A1    Aug. 16, 2012

(30) Foreign Application Priority Data
Sep. 28, 2009 (JP) .................. 2009-223350

(51) Int. Cl.
G05D 23/00 (2006.01)
F24D 17/02 (2006.01)
F24D 19/10 (2006.01)

(52) U.S. Cl.
CPC ............ *F24D 17/02* (2013.01); *F24D 19/1039* (2013.01); *F24D 19/1054* (2013.01); *F24D 2200/12* (2013.01); *F24D 2220/08* (2013.01); *G05B 2219/2658* (2013.01)

(58) Field of Classification Search
CPC .. F24D 17/02; F24D 19/1039; F24D 19/1054
See application file for complete search history.

(56) References Cited

U.S. PATENT DOCUMENTS

| | | | | |
|---|---|---|---|---|
| 3,959,986 | A | * | 6/1976 | Ledermann ......... F24D 11/0214 62/160 |
| 4,549,526 | A | * | 10/1985 | Lunde .................. F23L 17/005 126/367.1 |
| 4,971,136 | A | | 11/1990 | Mathur et al. |
| 5,052,186 | A | * | 10/1991 | Dudley .................... F24H 4/04 62/215 |
| 7,274,975 | B2 | * | 9/2007 | Miller ................... G06Q 50/06 700/295 |
| 2005/0132732 | A1 | | 6/2005 | Eisenhower et al. |

(Continued)

FOREIGN PATENT DOCUMENTS

| | | |
|---|---|---|
| JP | 798156 A | 4/1995 |
| JP | 09068369 | 3/1997 |

(Continued)

OTHER PUBLICATIONS

European Search Report dated Apr. 16, 2014.

*Primary Examiner* — Alissa Tompkins
*Assistant Examiner* — Phillip E Decker
(74) *Attorney, Agent, or Firm* — Bacon & Thomas, PLLC

(57) ABSTRACT

A heat pump hot-water supply system includes a heat pump hot-water supply device, a storage tank for storing hot water obtained by operating the heat pump hot-water supply device, and a control device for controlling starting/stopping of the heat pump hot-water supply device. The control device estimates an outside air temperature of a place where the heat pump hot-water supply device is installed and determines an operating time zone of the heat pump hot-water supply device based on an estimated value of the outside air temperature.

7 Claims, 3 Drawing Sheets

(56) References Cited

U.S. PATENT DOCUMENTS

| | | | |
|---|---|---|---|
| 2006/0168961 A1* | 8/2006 | Alekseevich | F03D 9/007 60/641.8 |
| 2009/0211986 A1* | 8/2009 | Kates | E04H 4/129 210/742 |
| 2010/0286937 A1* | 11/2010 | Hedley | G06Q 30/02 702/60 |
| 2012/0205456 A1* | 8/2012 | Honma | F24D 19/1048 237/2 B |
| 2012/0247134 A1* | 10/2012 | Gurin | F24D 11/02 62/129 |
| 2013/0213069 A1* | 8/2013 | Elliott | F25B 30/06 62/213 |
| 2015/0159913 A1* | 6/2015 | Yamamoto | F24H 1/18 122/14.21 |

FOREIGN PATENT DOCUMENTS

| | | | | |
|---|---|---|---|---|
| JP | 2004251495 A | * | 9/2004 | F24H 1/00 |
| JP | 2005-257213 A | | 9/2005 | |
| JP | 2006-38387 A | * | 2/2006 | |
| JP | 2006038387 A | * | 2/2006 | |
| JP | 2007139213 A | | 6/2007 | |
| WO | WO 2009/105119 A1 | * | 8/2009 | |

\* cited by examiner

HEAT PUMP HOT-WATER SUPPLY SYSTEM

FIELD OF THE INVENTION

The present invention relates to a heat pump hot-water supply system, which includes a heat pump hot-water supply device, a storage tank, and a control device that controls the starting/stopping of the heat pump hot-water supply device.

BACKGROUND OF THE INVENTION

A conventional heat pump hot-water supply system is disclosed in Patent Document 1. In the conventional example disclosed in Patent Document 1, a heat pump hot-water supply device is operated in the nighttime during which the electricity rate is low, so that hot water to be used on the next day is stored in a storage tank.

An indicator that shows the performance (capability) of the heat pump hot-water supply device is exemplified by a coefficient of performance (COP). The COP is a ratio of an effective heating capacity to power consumption when the heat pump hot-water supply device is operated. For example, the COP of the heat pump hot-water supply device that has a heating capacity of 4.5 KW at a power consumption of 1.2 KW is calculated as $4.5 \div 1.2 \approx 3.7$. This COP of a given heat pump varies depending on the heat value obtainable from the outside air by the heat pump hot-water supply device, and rises as the temperature of the outside air increases. That is, if the heating capacity is kept constant, the power consumption of the heat pump hot-water supply device required to obtain the same heat value (amount of hot water) decreases in proportion to an increase in the outside air temperature.

However, since the conventional system disclosed in Patent Document 1 whose main concern is to reduce the operating cost operates the heat pump hot-water supply device in the nighttime during which the electricity rate is low, it may not be able to achieve power (energy) savings.

[Patent Document 1] Japanese Patent Application Publication No. H9-68369

SUMMARY OF THE INVENTION

In view of the above, the present invention provides a heat pump hot-water supply system which is able to accomplish power (energy) savings.

In accordance with an embodiment of the present invention, there is provided a heat pump hot-water supply system, including a heat pump hot-water supply device, a storage tank for storing hot water obtained by operating the heat pump hot-water supply device, and a control device for controlling starting/stopping of the heat pump hot-water supply device, wherein the control device estimates an outside air temperature of a place where the heat pump hot-water supply device is installed and determines an operating time zone of the heat pump hot-water supply device based on an estimated value of the outside air temperature.

With such configuration, the control device selects a time zone in which the estimated value of the outside air temperature is comparatively high and operates the heat pump hot-water supply device during such a time zone, thereby accomplishing power (energy) savings, as compared to operating the heat pump hot-water supply device over a time zone in which the outside air temperature is comparatively low.

The control device may compare an outside air temperature of a current day and an estimated value of an outside air temperature of a next day to determine an operating time zone of the heat pump hot-water supply device.

The control device may operate the heat pump hot-water supply device on the current day if the outside air temperature of the current day is higher than the estimated value of the outside air temperature of the next day.

The control device may operate the heat pump hot-water supply device on the next day if the outside air temperature of the current day is lower than the estimated value of the outside air temperature of the next day.

The control device may operate the heat pump hot-water supply device in a time zone in which the estimated value of the outside air temperature is at a maximum in a predetermined period of time starting from a current time.

According to the present invention, power (energy) savings can be achieved.

BRIEF DESCRIPTION OF THE DRAWINGS

The objects and features of the present invention will be apparent from the following description of embodiments when taken in conjunction with the accompanying drawings, in which.

DETAILED DESCRIPTION OF THE PREFERRED EMBODIMENTS

Figure 1:
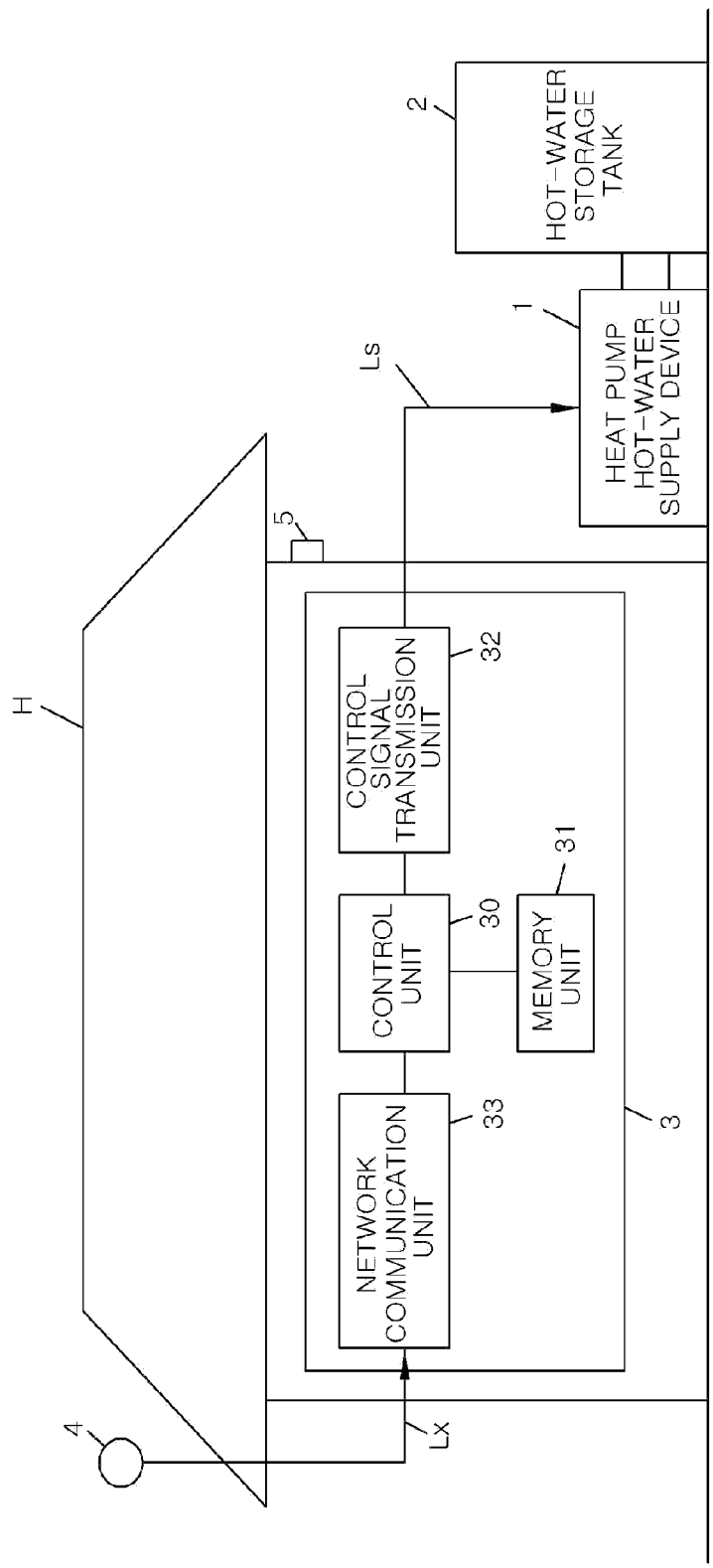
FIG. 1 shows a system configuration in accordance with an embodiment of the present invention.

Embodiments of the present invention will be described in detail below with reference to the accompanying drawings that form a part hereof. The same reference numerals will be assigned to the same or similar components throughout the drawings, and redundant descriptions thereof will be omitted.

As shown in FIG. 1, a heat pump hot-water supply system in accordance with the present embodiment includes a heat pump hot-water supply device 1, a storage tank 2 for storing hot water obtained by operating the heat pump hot-water supply device 1, and a control device 3 for controlling the starting/stopping of the heat pump hot-water supply device 1. The heat pump hot-water supply device 1 and the storage tank 2 are installed outside a house H, and the control device 3 is provided inside the house H.

The heat pump hot-water supply device 1 is conventionally known, and has a heat pump cycle including an air heat exchanger for absorbing heat from the outside air (atmosphere), a compressor, a hydrothermal exchanger and expansion valves. The heat pump hot-water supply device 1 further includes pumps and pipes for returning cold water supplied from the storage tank 2 back to the storage tank 2 via the hydrothermal exchanger included in the heat pump cycle. Also, the storage tank 2 is connected to a pipe for supplying water to the storage tank 2 from a water service and a pipe for supplying hot water stored in the storage tank 2 to a house H. As such, in the heat pump hot-water supply device 1, when a control signal transmitted via a signal line Ls from the control device 3 as will be described later indicates to start operation of the heat pump hot-water supply device 1, the compressor and the pump are operated so that the system is put in an on-state, whereas when the control signal indicates to stop the operation of the heat pump hot-water supply device 1, the operations of the compressor and the pump are stopped so that the system is put in an off-state. Because the structures and the operations of the heat pump hot-water supply device 1 and the storage tank 2 are conventionally known, the depiction and the description thereof are omitted.

As shown in FIG. 1, the control device 3 includes a control unit 30 having a microcomputer as a main component, a memory unit 31 formed of electrically rewritable semiconductor memory (for example, flash memory) and storing a program that can be executed by the microcomputer of the control unit 30 and a variety of data, a control signal transmission unit 32 for transmitting a control signal to the heat pump hot-water supply device 1 via the signal line Ls, and a network communications unit 33 that performs network communications with the Internet 4 via a communications line Lx such as a telephone line, a CATV coaxial cable or an optical fiber cable.

The control unit 30 controls the starting/stopping of the heat pump hot-water supply device 1 in response to the control signal transmitted via the signal line Ls from the control signal transmission unit 32. Furthermore, instead of transmitting the control signal via the dedicated signal line Ls, the control signal transmission unit 32 may transmit a control signal via a power line (not shown) arranged in the house H, using power line communications, or transmit a control signal by using radio waves as a communications medium, like a low-power radio communications station.

Figure 2:
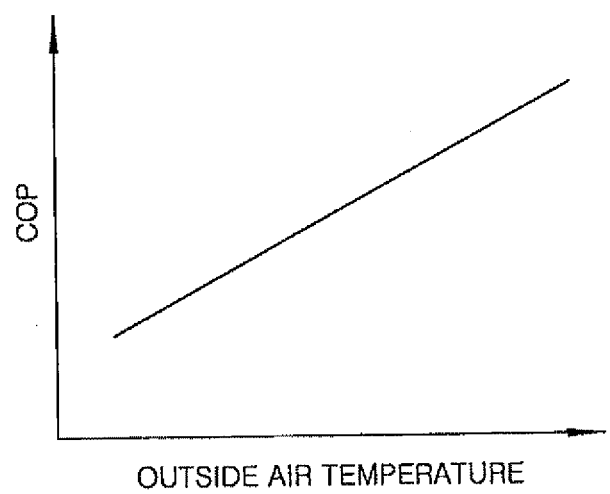
FIG. 2 shows a graph of a correlation between the outside air temperature and a coefficient of performance in the system in accordance with the embodiment of the present invention.

The conventional system disclosed in Patent Document 1 has been proposed to reduce the operating cost (electricity price) in such a manner that the heat pump hot-water supply device is operated in a time zone (e.g. the nighttime) in which the electricity rate is comparatively low. However, because there is a positive relationship between the COP of the heat pump hot-water supply device 1 and the outside air temperature as mentioned in the conventional case (see FIG. 2), the power consumption of the heat pump hot-water supply device 1 required to obtain the same amount of hot water (the amount of supplied hot water) is decreased in proportion to the increase in the outside air temperature.

Thus, the control device 3 in accordance with the present embodiment estimates an outside air temperature of a place where the heat pump hot-water supply device 1 is installed (outside of the house H) and also determines an operating time zone of the heat pump hot-water supply device based on the estimated value of the outside air temperature. For example, the outside air temperature of the current day and the estimated value of the outside air temperature of the next day are compared with each other. If the outside air temperature of the current day is higher than the estimated value of the outside air temperature of the next day, the heat pump hot-water supply device 1 is controlled to be operated on the current day so that hot water required on the next day is stored in the storage tank 2. In contrast, if the outside air temperature of the current day is lower than the estimated value of the outside air temperature of the next day, hot water required on the next day is controlled to be supplied by operating the heat pump hot-water supply device 1 on the next day.

In this regard, the control unit 3 accesses a website which provides weather information such as weather forecasts (e.g. the website of a central meteorological agency or a local meteorological agency) via the Internet 4 through the network communications unit 33, so that information (data) about the predicted maximum temperature of the next day of a region where the house H is located is acquired from the website, and the predicted maximum temperature as acquired is determined as the predicted value of the outside air temperature of the next day. For the outside air temperature of the current day, the temperature of the current day (which is actually measured or estimated) acquired from the website may be used, or alternatively the temperature value measured by using a temperature sensor 5 provided outside the house H may be used. Whether the actually measured temperature acquired from the website is used or the estimated temperature acquired from the website is used or the temperature value measured by using the temperature sensor 5 is used depends on a program preset in the memory unit 31 of the control device 3.

Specifically, in the case where the estimated value of the outside air temperature of the current day, i.e., specifically, the predicted maximum temperature, is used from the website, it is compared with the estimated value of the outside air temperature of the next day (the predicted maximum temperature). If the predicted maximum value of the outside air temperature of the current day is higher than the predicted maximum value of the outside air temperature of the next day, the heat pump hot-water supply device is operated in the time zone, wherein the temperature of the current day is predicted to be at a maximum (which may also be acquired from the website). On the other hand, if the predicted maximum value of the outside air temperature of the current day is lower than the predicted maximum value of the outside air temperature of the next day, the heat pump hot-water supply device 1 is operated on the next day.

In the case where the actually measured values of the outside air temperature of the current time acquired from the website or the values measured by the temperature sensor 5 are used, these values may be compared with the predicted maximum values of the outside air temperature of the next day at intervals of a predetermined period of time, for example, every 30 min. Accordingly, if the outside air temperature of the current day is higher than the predicted maximum value of the outside air temperature of the next day, the heat pump hot-water supply device 1 is operated at that time. On the other hand, if there is no case in which the outside air temperature of the current day is higher than the estimated value of the outside air temperature of the next day, the heat pump hot-water supply device 1 is to be operated in the time zone, wherein the temperature of the next day is predicted to be at a maximum.

In the case where the outside air temperature values of the first day (the current day) and the second day (the next day) are compared and the heat pump hot-water supply device 1 is operated on the second day, the outside air temperature value of the second day and that of the third day are not compared, and the outside air temperature value of the third day and that of the fourth day will be compared and the same control operation as detailed above will be performed.

This is because, in the case when the outside air temperature or the estimated value of the outside air temperature keeps increasing day by day, sequentially comparing the outside air temperature values of the first day and the second day, those of the second day and the third day and those of the third day and the fourth day, the estimated values of the outside air temperature of the next days will be higher and thus the operation of the heat pump hot-water supply device 1 will not take place on the current day and will be continuously postponed until the next days, and consequently there may occur a situation wherein the heat pump hot-water supply device 1 will not be operated for a few days. To prevent this situation, when the outside air temperature values of the first day and the second day are compared and hot water is stored in the storage tank 2 on the second day, the outside air temperature value of the second day and that of the third day are not compared and the outside air temperature value of the third day and that of the fourth day will be compared. Accordingly, the heat pump hot-water supply device is operated for at least one day of the two days.

Figure 3:
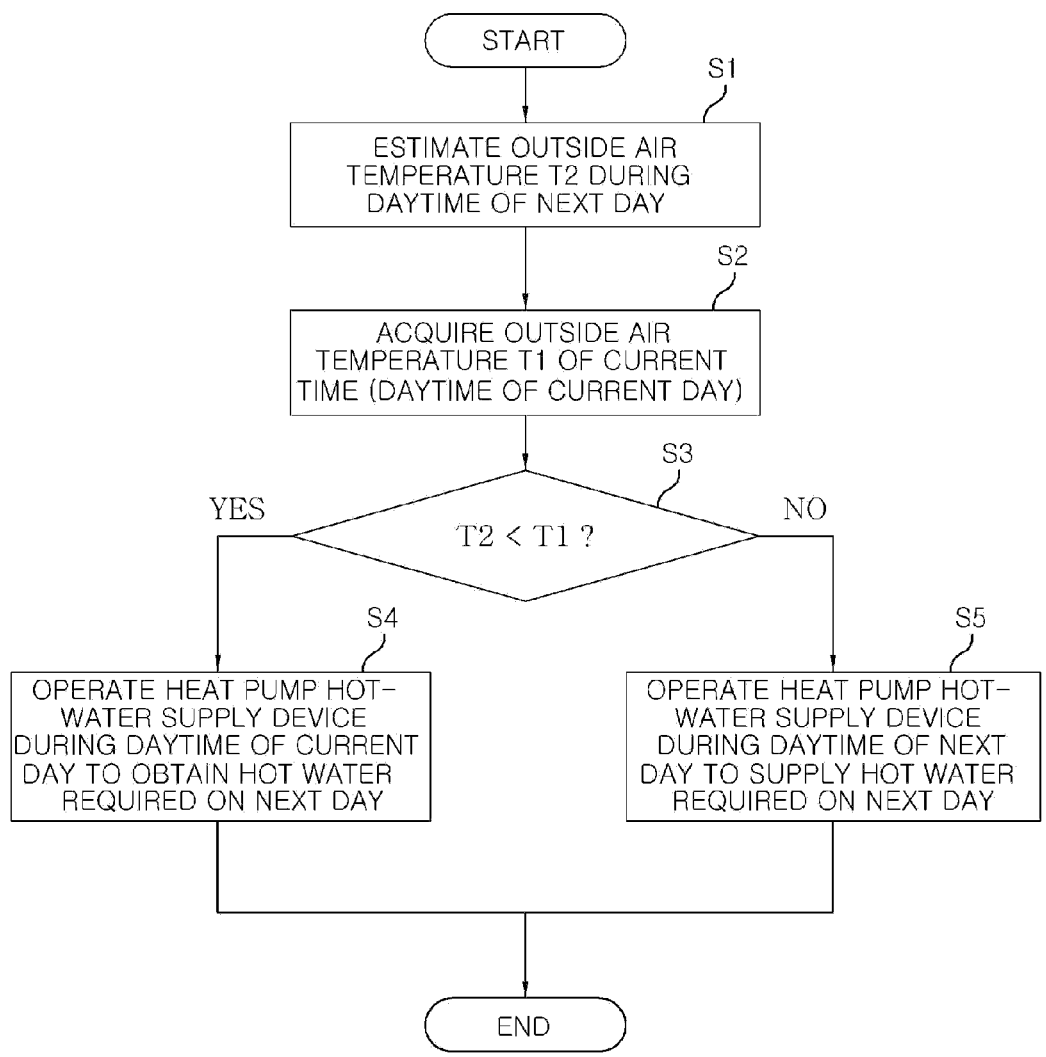
FIG. 3 shows a flowchart of an operation of a control device in the system in accordance with the embodiment of the present invention.

With reference to the flowchart of FIG. 3, the operation of the control unit 30 of the control device 3 is described below.

It is assumed that the actually measured value of the outside air temperature acquired from the website or the value measured by using the temperature sensor 5 be used as the outside air temperature of the current day.

The control unit 30 acquires, as the estimated value T2 of the outside air temperature of the next day, the predicted maximum temperature of the next day from the website (step S1), and the outside air temperature T1 of the current time (e.g. the daytime of the current day) from the website or by using the temperature sensor 5 (step S2), and compares these two outside air temperature values T1 and T2 at an interval of a predetermined period of time (step S3).

Furthermore, the control unit 30 operates the heat pump hot-water supply device 1 during the daytime on the current day to store hot water required on the next day in the storage tank 2 if the outside air temperature T1 of the current day (e.g. the temperature of the daytime) is higher than the estimated value T2 of the outside air temperature of the next day (step S4). Also, the control unit 30 will operate the heat pump hot-water supply device 1 in the time zone of the next day, wherein the temperature of the next day is predicted to be at a maximum, to supply hot water required on the next day if the outside air temperature T1 during the daytime of the current day is equal to or lower than the estimated value T2 of the outside air temperature during the daytime of the next day (step S5).

In the above embodiment, the heat pump hot-water supply device 1 is controlled to operate in the time zone in which the outside air temperature is the highest and the same heating capacity can be obtained with a lower power consumption based on only the COP of the heat pump hot-water supply device 1. However, the heat pump hot-water supply device 1 may be operated in the time zone in which the cost required to supply the substantially same amount of hot water is the lowest, in consideration of the electricity rate as well as the COP of the heat pump hot-water supply device 1.

The commercial power system sets the power rate that varies depending on the time zone. For example, the same electricity rate is applied in a time zone of the early morning from 7 a.m. to 10 a.m. and a time zone of the evening from 5 p.m. to 11 p.m., the highest electricity rate is applied for the time zone of the daytime from 10 a.m. to 5 p.m., and the lowest electricity rate is applied in the time zone of the nighttime from 11 p.m. to 7 a.m. on the next day. In order to determine the time zone in which the price required to supply the same amount of hot water is the lowest, on the assumption that the time zones of the early morning and the evening having the same electricity rate are defined as P1, the time zone of the daytime is defined as P2 and the time zone of the nighttime is defined as P3, the maximum temperatures in the respective time ranges of P1, P2, P3 are acquired from the website, and the COP is calculated based on the maximum temperature in each time range and divided by the electricity rate set for the corresponding time zone. Ultimately, when the heat pump hot-water supply device 1 is operated in the range where the above result value is the greatest, the total electricity price required to supply the same amount of hot water becomes the lowest.

Instead of operating the heat pump hot-water supply device 1 in the nighttime due to the low electricity rate, by taking into consideration both the electricity rate and the COP of the heat pump hot-water supply device 1, the time zone in which the total electricity price is actually decreased is determined and the heat pump hot-water supply device 1 is operated in such a time zone, thereby saving on power and reducing the expenditure.

Alternatively, the control unit 30 of the control device 3 may control the heat pump hot-water supply device 1 to be operated in the time zone in which the estimated value of the outside air temperature is at a maximum in a predetermined period of time at an interval of the predetermined period of time (e.g. 24 hr) starting from the current time.

Alternatively, the control unit 30 of the control device 3 may control the heat pump hot-water supply device 1 to be operated in the time zone in which the estimated value of the outside air temperature is at a maximum in one day (from 0 hr to 24 hr).

In the present embodiment as described above, the control unit 30 of the control device 3 selects the time zone in which the estimated value of the outside air temperature is comparatively high and operates the heat pump hot-water supply device 1 in such a time zone, thereby accomplishing power (energy) savings, as compared to operating the heat pump hot-water supply device 1 in the time zone in which the outside air temperature is comparatively low.

Also in the above embodiment, although a house is given by way of example as the place to which the heat pump hot-water supply system is applied, the present invention is not limited thereto, and may include a complex house such as a mansion, an office, a business section, and the like.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A heat pump hot-water supply system, comprising a heat pump hot-water supply device, a storage tank for storing hot water obtained by operating the heat pump hot-water supply device, and a control device for controlling operation of the heat pump hot-water supply device,
    wherein the control device is configured to acquire outside air temperatures of a place where the heat pump hot-water supply device is installed,
    wherein the acquired outside air temperatures include a predicted highest outside air temperature of the current day and a predicted highest outside air temperature of a next day, and
    wherein the control device is configured to compare the predicted highest outside air temperature of the current day and the predicted highest outside air temperature of the next day, and
    wherein, if the predicted highest outside air temperature of the current day is equal to or higher than the predicted highest outside air temperature of the next day, the control device operates the heat pump hot-water supply device in a time zone of the current day to which the predicted highest outside air temperature of the current day belongs, and
    if the predicted highest outside air temperature of the current day is lower than the predicted highest outside air temperature of the next day, the control device operates the heat pump hot-water supply device in a time zone of the next day to which the predicted highest outside air temperature of the next day belongs.

2. The heat pump hot-water supply system of claim 1, the outside air temperatures of the place are acquired from a communications network.

3. A heat pump hot-water supply system, comprising a heat pump hot-water supply device, a storage tank for storing hot water obtained by operating the heat pump hot-water supply device, and a control device for controlling operation of the heat pump hot-water supply device,
- wherein the control device is configured to set non-overlapping periods of time and acquire, for each of the non-overlapping periods of time, a predicted highest outside air temperature of a place where the heat pump hot-water supply device is installed, and
- wherein the control device operates the heat pump hot-water supply device in a time zone to which the predicted highest outside air temperature belongs.

4. The heat pump hot-water supply system of claim 3, the predicted highest outside air temperature is acquired from a communications network.

5. A heat pump hot-water supply system, comprising a heat pump hot-water supply device, a storage tank for storing hot water obtained by operating the heat pump hot-water supply device, and a control device for controlling operation of the heat pump hot-water supply device,
- wherein the control device is configured to obtain measured outside air temperatures of a current day and a predicted highest outside air temperature of a next day and compare the measured outside air temperatures of the current day and the predicted highest outside air temperature of the next day until there is found a measured outside air temperature of the current day equal to or higher than the predicted highest outside air temperature of the next day, the measured outside air temperatures of the current day and the predicted highest outside air temperature of the next day being temperatures of a place where the heat pump hot-water supply device is installed,
- wherein the control device starts operating the heat pump hot-water supply device when there is found the measured outside air temperature of the current day equal to or higher than the predicted highest outside air temperature of the next day, and
- wherein, if none of the measured outside air temperatures of the current day is higher than the predicted highest outside air temperature of the next day, the control device operates the heat pump hot-water supply device in a time zone to which the highest outside air temperature of the next day belongs.

6. The heat pump hot-water supply system of claim 5, wherein the measured outside air temperatures of the current day are obtained using a temperature sensor.

7. The heat pump hot-water supply system of claim 5, wherein the measured outside air temperatures of the current day are obtained from a communications network.

* * * * *